US006927341B1

(12) United States Patent
Crane

(10) Patent No.: US 6,927,341 B1
(45) Date of Patent: Aug. 9, 2005

(54) UNIVERSAL PAINT SHIELD

(76) Inventor: Richie L. Crane, 11420 Pine Lilly Pl., Bradenton, FL (US) 34237

( * ) Notice: Subject to any disclaimer, the term of this patent is extended or adjusted under 35 U.S.C. 154(b) by 0 days.

(21) Appl. No.: 10/675,045

(22) Filed: Sep. 29, 2003

(51) Int. Cl.[7] ............................................. H05K 5/03
(52) U.S. Cl. ......................... 174/66; 174/67; 220/241; 220/242; 16/DIG. 2
(58) Field of Search .............................. 174/66, 67, 53, 174/58, 57, 54; 220/3.2, 3.8, 3.7, 241, 242; 33/DIG. 10, 528, 562; 16/DIG. 2; 118/505, 118/504, 506; D13/154, 156; D8/352; 200/333

(56) References Cited

U.S. PATENT DOCUMENTS

| | | | |
|---|---|---|---|
| D185,531 S | 6/1959 | Carlson | |
| 3,386,071 A | 5/1968 | Allen | |
| 4,234,774 A | 11/1980 | Paparella | |
| D279,860 S | 7/1985 | Schwalbe | |
| 4,660,912 A | 4/1987 | Tomek | |
| D297,396 S | 8/1988 | Schwalbe | |
| 5,003,128 A | 3/1991 | Grondin | |
| 5,063,872 A | 11/1991 | Maus et al. | |
| 5,285,014 A | 2/1994 | Gilchrist | |
| D349,836 S | 8/1994 | Maggard | |
| D364,849 S | 12/1995 | DeWaal | |
| 5,526,952 A * | 6/1996 | Green ........................ | 220/241 |
| 5,723,816 A | 3/1998 | Neece | |
| D425,768 S | 5/2000 | Staley | |
| 6,103,974 A * | 8/2000 | Erdfarb ........................ | 174/66 |
| 6,165,269 A | 12/2000 | Kathe | |
| 6,317,995 B1 | 11/2001 | Hoffmann, Sr. | |
| 6,538,202 B1 * | 3/2003 | Shaffer et al. ................ | 174/66 |
| 6,683,248 B2 * | 1/2004 | Vrame et al. .................. | 174/66 |
| 6,703,562 B1 * | 3/2004 | Pacheco ....................... | 174/66 |
| 6,803,522 B2 * | 10/2004 | Skakun ......................... | 174/66 |

* cited by examiner

*Primary Examiner*—Dean A. Reichard
*Assistant Examiner*—Angel R. Estrada
(74) *Attorney, Agent, or Firm*—Charles J. Prescott

(57) ABSTRACT

A universal paint shield for releasable attachment to an electrical wall outlet or switch assembly for preventing paint from contacting any exposed surfaces thereof as the wall is painted. The paint shield has a molded plastic body formed as a unit having a front panel and top, bottom and side walls projecting rearward of the front panel and having substantially continuous outer edge portions. At least two opposing edge portions biasingly engage against the corresponding outer edge surfaces of the cover plate to entirely cover all surfaces of the cover plate and assembly. Top, bottom and side walls resiliently cooperate with edge portions which have concaved or arcuately inwardly contoured longitudinal edges to require that the edge sections, slightly smaller than the cover plate, be force fitted over the corresponding outer edge surfaces of the cover plate. The front panel preferably includes a forwardly extending offset central portion which defines an enlarged clearance cavity adapted to provide clearance for substantially all types of exposed components of such electrical wall assemblies.

4 Claims, 3 Drawing Sheets

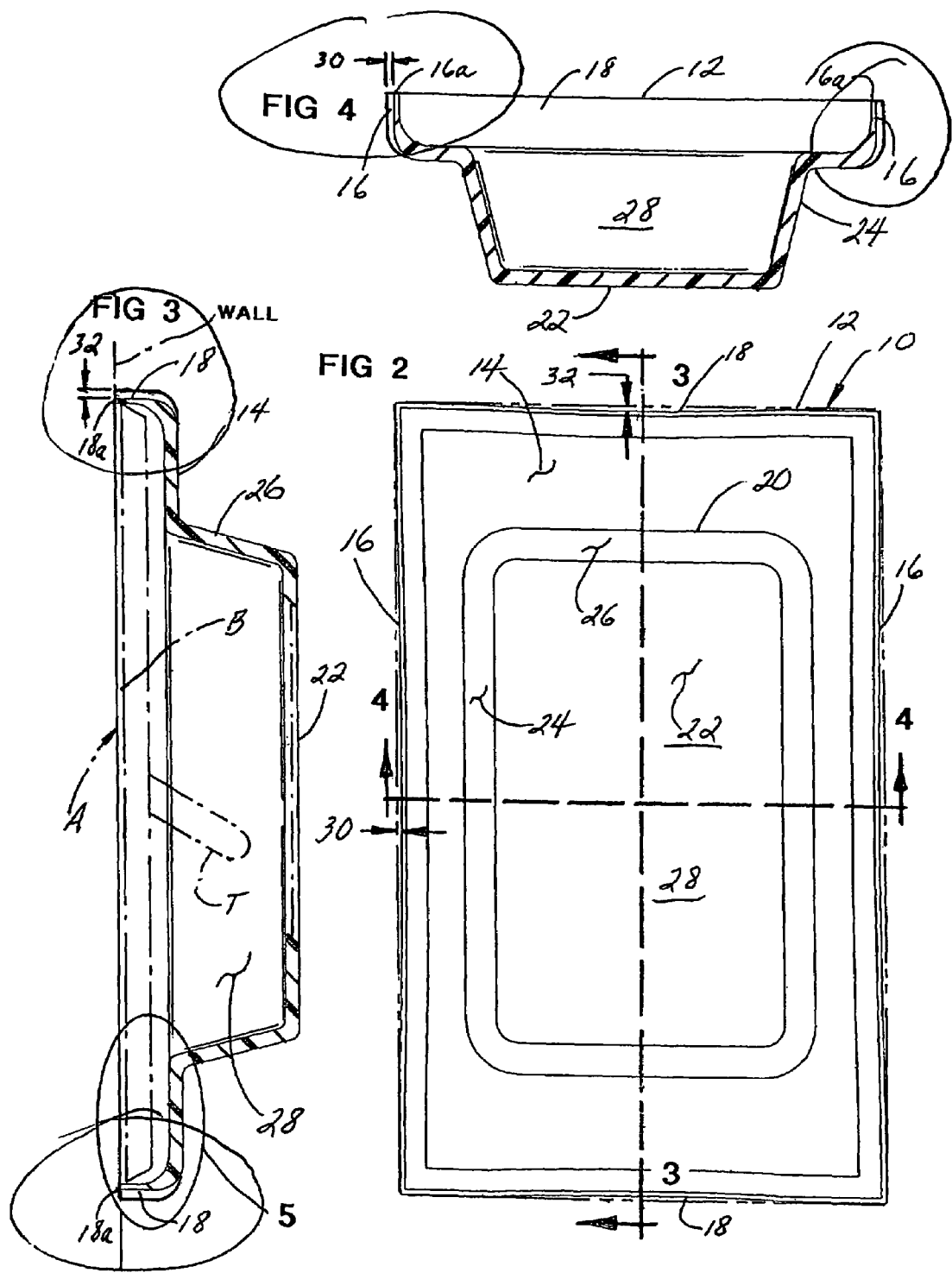

UNIVERSAL PAINT SHIELD

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to devices for covering wall electrical outlets and switches, and more particularly to a universal paint shield for temporarily covering electrical switches and outlets to prevent paint from contact therewith during wall and ceiling painting operations.

2. Description of Related Art

During painting operations of the interior of a building or home, it is typically the case that such painting operations which may be quickly done by using either spray equipment or paint roller applications. It is the preparation time of covering all non-painted surfaces associated with the walls that substantially adds to the overall painting project time.

One aspect of this preparation work is the prevention of inadvertently painting or splattering the wall electrical outlet assemblies including cover plates, electrical switches outlet and switch assemblies, the remaining exposed components thereof, including the outlet receptacles and switches, must also have been protectively masked off with the use of tape.

More recently, a number of prior art devices have been patented which provide thin molded paint shields for electrical switches and outlets which are adapted in various ways to be releasably attachable to cover all or portions of a particular electrical assembly and associated cover plate and exposed components thereof. Following is a list of known prior art devices which represent a significant effort at time reduction and painting efficiency, but which fail to disclose a universal design:

D185,531 to Carlson
D279,860 to Schwalbe
D297,396 to Schwalbe
D349,836 to Maggard
D364,849 to De Waal
D425,768 to Staley
3,386,071 to Allen
4,234,774 to Paparella
4,660,912 to Tomek
5,003,128 to Grondin
5,063,872 to Maus et al.
5,285,014 to Gilchrist
5,723,816 to Neece
6,103,974 to Erdfarb
6,165,269 to Kathe
6,317,995 to Hoffmann, Sr.

However, none of these prior art devices appear to provide a universal paint shield which is adapted to be easily installable onto virtually all types and sizes of electrical switches and outlets of a given standard size and their associated cover plates and exposed components thereof. For example, Neece in U.S. Pat. No. 5,732,816 provides a paint shield for electrical switches in one embodiment thereof while providing in another embodiment a device which includes prongs which are insertable into the apertures of an electrical wall outlet. In U.S. Pat. No. 5,285,014, Gilchrist also teaches two embodiments of the invention in order to deal with electrical switch assemblies and separately electrical wall outlets each of which require protection during painting operations.

The present invention provides a universal paint shield for the easy and convenient protection of virtually all electrical wall switches and outlets and the associated cover plates and exposed components thereof. This paint shield is easily attachable over and biasingly secured to the cover plate of such electrical assemblies and provides an offset central portion for the front panel of the device which forms a clearance cavity adapted in size and volume to enclose virtually all features of electrical switches and outlets without interference as this device does not depend upon the functional components of electrical switches and outlets for its releasable support therefrom. Rather, the uniquely inwardly curved opposing edge portions of either the top and bottom walls or side walls, or both, biasingly engage the corresponding outer edges of the cover plate to effect releasable retention of the device thereover during painting operations without the need for any disassembly or taping.

BRIEF SUMMARY OF THE INVENTION

This invention is directed to a universal paint shield for releasable attachment to an electrical wall outlet or switch assembly for preventing paint from contacting any exposed surfaces thereof as the wall is painted. The paint shield has a molded plastic body formed as a unit having a front panel and top, bottom and side walls projecting rearward of the front panel and having substantially continuous outer edge portions. At least two opposing edge portions biasingly engage against the corresponding outer edge surfaces of the cover plate to entirely cover all surfaces of the cover plate and assembly. Top, bottom and side walls resiliently cooperate with edge portions which have concaved or arcuately inwardly contoured longitudinal edges to require that the edge sections, slightly smaller than the cover plate, be force fitted over the corresponding outer edge surfaces of the cover plate. The front panel preferably includes a forwardly extending offset central portion which defines an enlarged clearance cavity adapted to provide clearance for substantially all types of exposed components of such electrical wall assemblies.

It is an object of this invention to provide a universal paint shield which is releasably attachable over and protectively covering virtually all sizes and configurations of electrical wall outlets and switch assemblies during wall painting operations.

It is another object of this invention to provide a unique forced biasing arrangement for the releasable attachment of a universal paint shield onto the cover plate of electrical wall outlet and switch assemblies to protect those assemblies from unintended paint splatter while painting the interior walls of a room.

Still another object of this invention is to provide a reusable universal paint shield in various standard sizes, each standard size being adapted to be protectively attachable to virtually any configuration of electrical wall outlet or switch assembly having that standard size perimeter.

In accordance with these and other objects which will become apparent hereinafter, the instant invention will now be described with reference to the accompanying drawings.

BRIEF DESCRIPTION OF THE SEVERAL VIEWS OF THE DRAWING(S)

FIG. 2 is a rear elevation view of the interior or rearwardly facing side of the invention shown in FIG. 1.

FIG. 3 is a section view in the direction of arrows 3—3 in FIG. 2.

FIG. 4 is a section view in the direction of arrows 4—4 in FIG. 2.

DETAILED DESCRIPTION OF THE INVENTION

Figure 1:
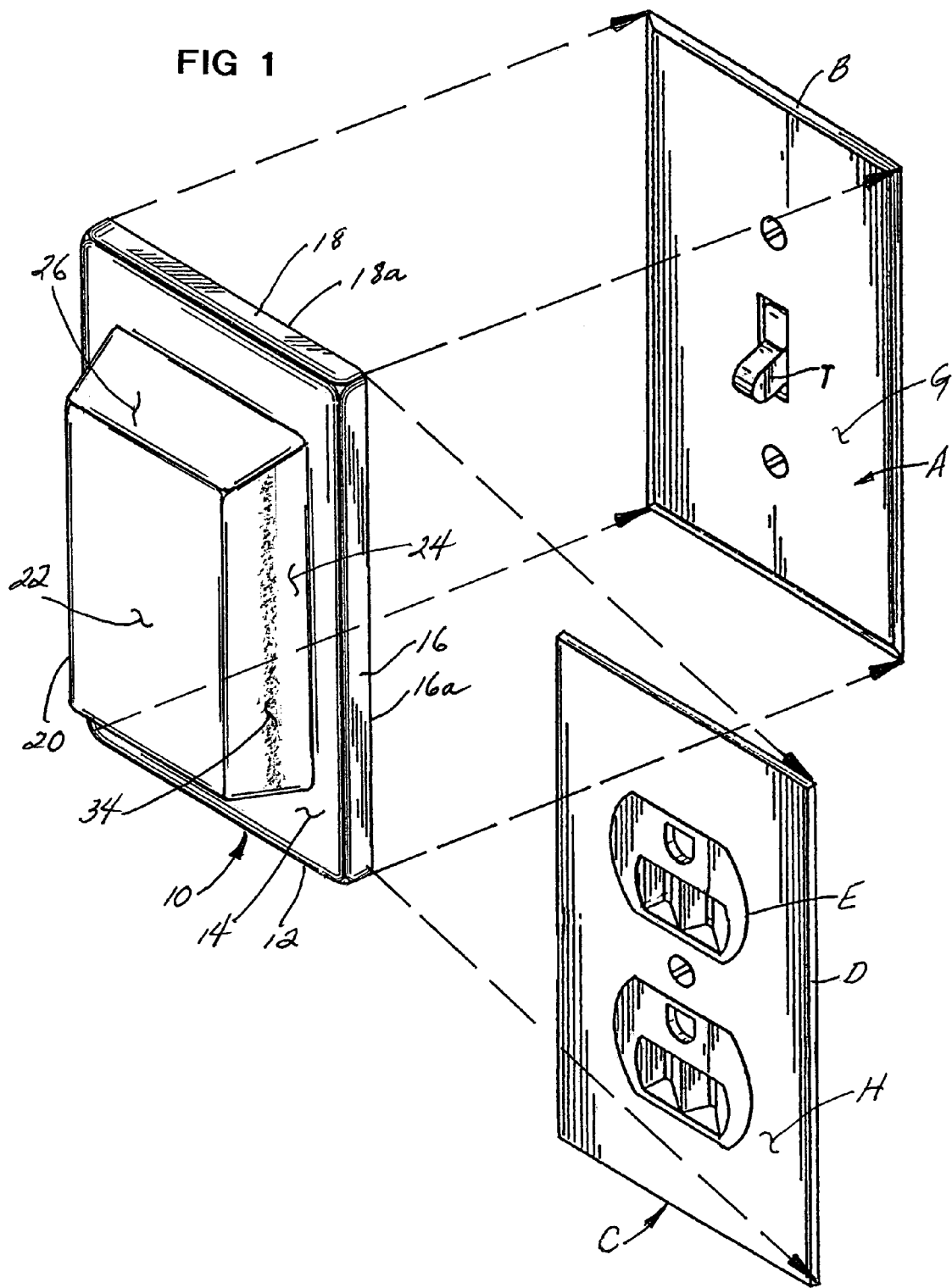
FIG. 1 is an exploded perspective view of the preferred embodiment of the invention shown being attachable to either a standard single width electrical wall switch assembly or an electrical wall outlet assembly.

Referring now to the drawings, the preferred embodiment of the invention is there shown generally at numeral 10 and includes a molded plastic body 12 formed as a single unit of uniform thickness of about 0.05"–0.06" and having a generally rectangular front panel 14 having a front or obverse surface and a rearward or reverse surface and opposing top and bottom walls 18 and opposing side walls 16 projecting rearwardly from the front panel 14. These top and bottom walls 18 and side walls 16 have continuous outer edge portions 16a and 18a which define the open reverse surface of the molded body 12.

The front panel 14 includes a preferably flat central portion 22 which is forwardly offset about 0.7" from the front panel 14 by tapered central wall portions 24 and 26. A central clearance cavity 28 having dimension of about 1.9" in width and 3.0" in length is thus defined which is adapted in interior volume and dimension to provide adequate clearance for exposed switch components such as the switch T which are a part of an electrical switch assembly A and associated cover plate G as best seen in FIGS. 1 and 3.

By this arrangement, the universal paint shield 10 is protectively attachable onto the outer edge surfaces of cover plates G or H of virtually any standard sized electrical switch or outlet assembly A or C, respectively. The front panel 14, being offset about 0.3" from the outer edge portions 18d and 16a of the top and bottom walls 18 and side walls 16, respectively, generally provide adequate clearance or spacing from the wall surface onto which an outlet assembly A is installed. This is also true with respect to the cover plate D of the wall outlet C. The clearance cavity 28 provides adequate clearance for any known exposed switch T or other toggle or slider component associated with virtually any electrical switch assembly.

Figure 5:
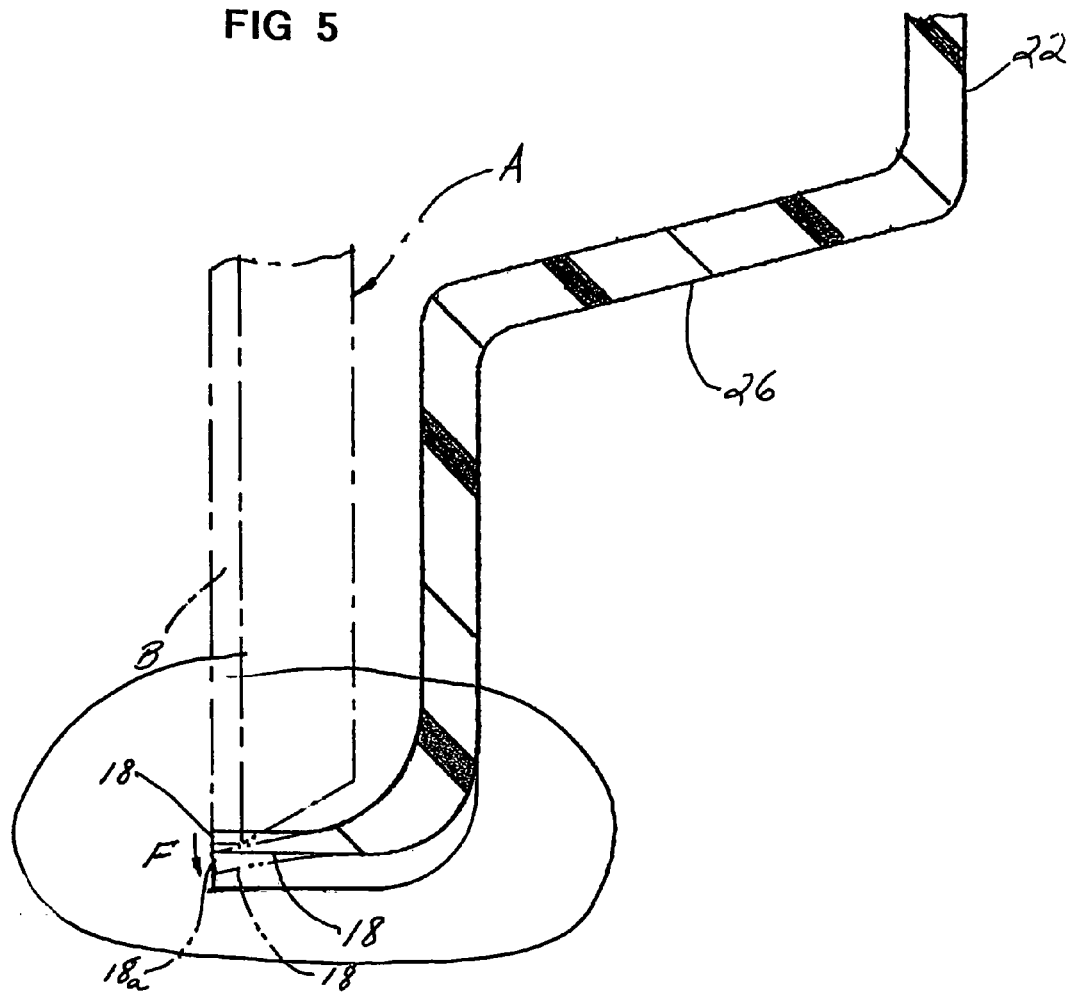
FIG. 5 is an enlarged view of area 5 in FIG. 3.

The universal paint shield 10 is biasingly attachable onto any standard sized cover plate such as G and H by the resilient biased gripping of the very outer edge surfaces B and D of the cover plates G and H. In general, the inner dimensions (4.52" and 2.78") of the outer edge portions 18a and 16a of the top and bottom walls 18 and the side walls 16, respectively, exactly match those of the corresponding standard cover plate B or D of electrical switch or outlet assembly A or C, respectively. However, as best seen in FIGS. 2 and 5, the outer edge portions 16a of the side walls 16 are arcuately inwardly contoured a distance 30 of about 0.03" from a perfectly straight edge shown in phantom for reference. Likewise, the top and bottom margins 18 are also arcuately inwardly formed and are displaced a distance 32 of about 0.30" from a true straight margin which is also shown in phantom for reference. These offset distances 30 and 32 of the corresponding outer edge portions 16a and 18a of the side walls 16 and top and bottom walls 18 are preferably in the range of 1/32". That is to say that, for example, the nominal width of a standard sized cover plate is 2.78" while the length is 4.52". The inner dimensions of the molded body 12 will be nominally equal to these width and length dimensions. However, each of the mid portions of the outer edge portions 16a and 18a will be displaced or curved arcuately inward as shown in FIG. 2 to a nominal width dimension of about 2.72" and a nominal length dimension of 4.47".

This inward contouring of the otherwise straight outer edge portions 16a and 18a at the central areas thereof requires that the universal paint shield 10 be thus forcibly urged into deployed biased engagement over the outer edge surface B or D of cover plates A and C, respectively to effect the only attachment means of the paint shield 10 over the cover plates B or D.

Note that the outer edge portions 18a and 16a of the top and bottom walls 18 and side walls 16, respectively, are somewhat thinner reduced in thickness from a nominal thickness of the molded body 12 of approximately 0.05–0.06" down to a thickness of approximately 0.02". This thinning of the top and bottom walls 18 and side walls 16 as best seen in FIG. 5 cooperates with the inwardly arcuate profile of the edge portions 16a and 18a to produce the inward biasing force against the outer edge surfaces B and D of cover plates A and C to retain the device 10 in position during normal painting operations. The side walls 16 and 18 flex outwardly in the direction of arrow F in FIG. 5 to create this biased holding force.

By this arrangement, the only retaining force provided or required by the present invention is produced by the resilient flexing of the top and/or bottom walls 18 and side walls 16 aided by the arcuate inward configurations at 30 and 32 in FIG. 2 of these top, bottom and side walls requiring forcible urging of the device 10 over the cover plate A and C and around the outer edge surfaces B and D.

It is noted that a total of only three size variations of this invention, coupled with the corresponding offset central portion of the front panel of each of these size embodiments are required to protectively deal with virtually all standard sizes of electrical switch and outlet assemblies typically encountered in the painting of the interior walls of a room of a home or building. These electrical switch and outlet size variations are due to the utilization of double and triple electrical outlet and switch assemblies which are ganged together and incorporating a multi-apertured cover plate (not shown).

As seen in FIG. 1, a textured or ribbed gripping band 34 is formed along the length of the outer surfaces of opposing side portions 24 of the clearance cavity for enhanced finger gripability of the paint shield during its deployment and particularly removal after painting operations are completed.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A universal paint shield for releasable attachment to an electrical wall outlet or switch assembly for preventing paint from contacting the cover plate of the assembly or any other exposes surfaces or components thereof, comprising:
   a molded plastic body formed as a unit including generally rectangular front panel having a front surface and a rear surface, top, bottom and side walls projecting rearward of said front panel and having continuous edge portions which define an open rear side of said body;
   at least two opposing said edge portions of said top and bottom or said side walls biasingly engaging the corresponding outer edge surfaces of the cover plate to entirely cover all front and side surfaces of said assembly, said top, bottom and side walls being formed with thin edge sections on the rear portions thereof, said opposing edge portions having concaved or inwardly contoured longitudinal edges which resiliently cooperate with said thin edge sections having a degree of resilience which allows them to be force fitted over the corresponding outer edge surfaces of the cover plate to provide an only means of releasably retaining said paint shield over the assembly.

2. A universal paint shield for releasable attachment to an electrical wall outlet or switch assembly for preventing paint being applied from contacting the cover plate of the assembly or any other exposes surfaces thereof, comprising:
   a molded plastic body formed as a unit having generally rectangular front panel having a front surface and a rear surface, top, bottom and side walls projecting rearward of said front panel and having continuous outer edge portions;
   said front panel having a forwardly extending central panel portion which defines an enlarged clearance cavity which rearwardly opens and faces the assembly;
   said edge portions of said top and bottom or said side walls biasingly engaging against the corresponding outer edge surfaces of the cover plate to entirely cover and protect all front and side surfaces of said assembly, said top, bottom and side walls being formed with thin edge sections on the rear portions thereof, said edge portions along the lengths thereof arcuately inwardly contoured cooperating with said thin edge sections to provide a degree of resilience which allows them to be force fitted over the corresponding outer edge surfaces of the cover plate to securely releasably retain said panel shield in a deployed position over the assembly.

3. A universal paint shield for releasable attachment to an electrical wall outlet or switch assembly for preventing paint being applied to an adjacent wall surface from contacting the cover plate of the assembly or any other exposes surfaces and components thereof as the wall is painted, comprising:
   a molded plastic body formed having generally uniform section thickness, including a generally rectangular front panel having a front surface and a rear surface, top, bottom and side walls projecting rearward of said front panel and having continuous outer edge portions;
   said front panel having a forwardly extending central portion which defines an enlarged clearance cavity which rearwardly opens to face the assembly and is adapted to provide adequate clearance for all exposed surfaces and components of a wide variety of any such assemblies;
   at least two opposing said edge portions of said top and bottom or said side walls biasingly engaging against the corresponding outer edge surfaces of the cover plate to entirely cover all exposed front and side surfaces of said assembly, said edge portions having opposing inwardly contoured longitudinal edges spaced apart at central portions thereof a distance just slightly less than a corresponding or width of the cover plate and of sufficient resilience to allow them to be force fitted over the corresponding outer edge surfaces of the cover plate for biased releasable retention of said paint shield in a deployed position over the cover plate.

4. A universal paint shield as set forth in claim 3, further comprising:
   a textured or ribbed gripping band formed into outer surfaces of the side portions of the clearance cavity for enhanced finger gripability of said paint shield during deployment and removal.

\* \* \* \* \*